US012567793B2

(12) United States Patent
Al-Mufti

(10) Patent No.: US 12,567,793 B2
(45) Date of Patent: Mar. 3, 2026

(54) SYSTEM AND METHOD FOR PROVIDING A DIRECT CURRENT POWER TO A TIME DOMAIN DUPLEXING RADIO

(71) Applicant: Outdoor Wireless Networks LLC, Claremont, NC (US)

(72) Inventor: Khalid W. Al-Mufti, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 0 days.

(21) Appl. No.: 18/874,023

(22) PCT Filed: Jun. 8, 2023

(86) PCT No.: PCT/US2023/024863
§ 371 (c)(1),
(2) Date: Dec. 11, 2024

(87) PCT Pub. No.: WO2024/006046
PCT Pub. Date: Jan. 4, 2024

(65) Prior Publication Data
US 2025/0364891 A1      Nov. 27, 2025

Related U.S. Application Data

(60) Provisional application No. 63/357,747, filed on Jul. 1, 2022.

(51) Int. Cl.
*H02M 1/00*      (2006.01)
*H02J 1/06*      (2006.01)

(52) U.S. Cl.
CPC ............... *H02M 1/009* (2021.05); *H02J 1/06* (2013.01); *H02M 1/0009* (2021.05); *H02J 2310/20* (2020.01)

(58) Field of Classification Search
CPC ........ H02M 1/009; H02M 1/0009; H02J 1/06; H02J 2310/20
See application file for complete search history.

(56) References Cited

U.S. PATENT DOCUMENTS

| | | |
|---|---|---|
| 6,262,904 B1 | 7/2001 | Meynard et al. |
| 2017/0295497 A1 | 10/2017 | Macmullan et al. |
| 2024/0128872 A1* | 4/2024 | Al-Mufti ............. H02M 3/1584 |

FOREIGN PATENT DOCUMENTS

| | | |
|---|---|---|
| JP | H06055009 B2 | 7/1994 |
| KR | 1020210024324 A | 3/2021 |

(Continued)

OTHER PUBLICATIONS

International Searching Authority, "International Search Report and Written Opinion", dated Oct. 4, 2023, from PCT Application No. PCT/US2023/0248636, pp. 1 through 10, Published: WO.

(Continued)

*Primary Examiner* — Adolf D Berhane
(74) *Attorney, Agent, or Firm* — Fogg & Powers LLC

(57) ABSTRACT

Techniques are provided for improving power efficiency of a multiphase direct current (DC)-DC voltage converter configured to provide DC power to a time domain duplexing radio by enabling a number of phases during a downlink subframe and disabling the number of phases on or after cessation of the downlink subframe.

31 Claims, 7 Drawing Sheets

(56) References Cited

FOREIGN PATENT DOCUMENTS

WO      2020000736  A1      1/2020
WO      2024006046  A1      1/2024

OTHER PUBLICATIONS

Yue, Xialong, "Impedance-Based Interaction Analysis for AC/DC
and DC/DC Converters in Telecom Power System", 978-1-7281-
4829-8/20, as downloaded May 12, 22 from IEEE Xplore, pp. 3562
through 3566.

* cited by examiner

100B

440

440A — Synchronize Time

440B — Receive TDD Configuration or Indication of TDD Configuration, and Reference Time 440C — Determine Start and End Times of Each DL Subframe 440D — Enable at Least One Additional Phase Prior to Commencement of Each DL Subframe 440E — Disable The at Least One Additional Phase After Cessation of Each DL Subframe <u>550</u>

550A — Measure Output Direct Current Provided

550B — Identify TDD Configuration and Determine A Reference Time

550C — Determine Start and End Times of Each DL Subframe

550D — Enable at Least One Additional Phase Prior to Commencement of Each DL Subframe 550E — Disable The at Least One Additional Phase After Cessation of Each DL Subframe

SYSTEM AND METHOD FOR PROVIDING A DIRECT CURRENT POWER TO A TIME DOMAIN DUPLEXING RADIO

CROSS-REFERENCE TO RELATED APPLICATIONS

The present application is a 371 National Stage Application of International Application No. PCT/US2023/024863, filed on Jun. 8, 2023, which claims benefit of U.S. Patent Application Ser. No. 63/357,747 filed Jul. 1, 2022; the entire contents of the aforementioned patent application are incorporated herein by reference as if set forth in its entirety.

BACKGROUND

A power supply is used to provide power to a radio of a cellular communications system. However, a conventional power supply may not operate efficiently over a range of power output. International patent application PCT/US2022/017290, entitled "System and Method for a Feedforward Direct Current Voltage Converter" and having an international filing date of Feb. 22, 2022, (hereinafter the '290 Application) discloses techniques for enhancing the efficiency of the voltage converter. However, less complicated techniques for enhancing the efficiency of the voltage converter, configured to power a time domain duplexing (TDD) radio, are desirable.

SUMMARY

A method is provided for more efficiently providing direct current (DC) power to a time division duplexing (TDD) radio. The method comprises: synchronizing timing of a multiphase DC-DC voltage converter with a time source external to the multiphase DC-DC voltage converter; determining a TDD frame configuration and a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, enabling at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

A non-transitory computer readable medium is provided and which stores a program causing at least one processor to execute a process to more efficiently provide direct current (DC) power to a time division duplexing (TDD) radio. The process comprises: synchronizing timing of a multiphase DC-DC voltage converter with a time source external to the multiphase DC-DC voltage converter; determining a TDD frame configuration and a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, causing enablement of at least one additional phase of the multiphase DC-DC voltage converter; and using the determined end time of each downlink subframe in the TDD frame, on or after cessation of each downlink subframe in the TDD frame, causing disablement of the at least one additional phase of the multiphase DC-DC voltage converter.

An apparatus is provided that more efficiently provides direct current (DC) power to a time division duplexing (TDD) radio. The apparatus comprises: multiphase DC-DC voltage converter circuitry comprising more than one phase configured to be electrically coupled, through electrical conductors, to a DC power input of the TDD radio; and processing circuitry communicatively coupled to the multiphase DC-DC voltage converter circuitry, configured to be communicatively coupled to a time source external to the apparatus, and configured to: synchronize timing of the apparatus with the time source external to the apparatus; determine a TDD frame configuration and a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using the determined start time of each downlink subframe in the TDD frame, during each downlink subframe, of the TDD frame, of the TDD radio, enable at least one additional phase of the multiphase DC-DC voltage converter circuitry; and using the determined end time of each downlink subframe in the TDD frame, on or after cessation of each downlink subframe in the TDD frame, disable the at least one additional phase of the multiphase DC-DC voltage converter circuitry.

A method is provide for more efficiently providing direct current (DC) power to a time division duplexing (TDD) radio, the method comprising: measuring direct current drawn from an output of a multiphase DC-DC voltage converter; using the direct current, identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, enabling at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

A non-transitory computer readable medium is provided and which stores a program causing at least one processor to execute a process to more efficiently provide direct current (DC) power to a time division duplexing (TDD) radio. The process comprises: receiving measurements of direct current drawn from an output of a multiphase DC-DC voltage converter; using the measurements, identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, causing enablement of at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

An apparatus is provided that more efficiently provides direct current (DC) power to a time division duplexing (TDD) radio. The apparatus comprises: multiphase DC-DC voltage converter circuitry comprising more than one phase configured to be electrically coupled, through electrical conductors, to a DC power input of the TDD radio; and processing circuitry communicatively coupled to the multiphase DC-DC voltage converter circuitry and configured to: receive measurements of direct current drawn at an output of the apparatus; using the measurements, identify a TDD frame configuration of the TDD radio and determining a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using at least one of the TDD frame configuration and the reference time, determine a start time and an end time of each downlink subframe in a TDD frame; using the determined start time of each downlink subframe in the TDD frame, during each downlink subframe, of the TDD frame, of the TDD radio, enable at least one additional phase of the multiphase DC-DC voltage converter circuitry; and using the determined end time of each downlink subframe in the TDD frame, on or after cessation of each downlink subframe in the TDD frame, disable the at least one additional phase of the multiphase DC-DC voltage converter circuitry.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1A:
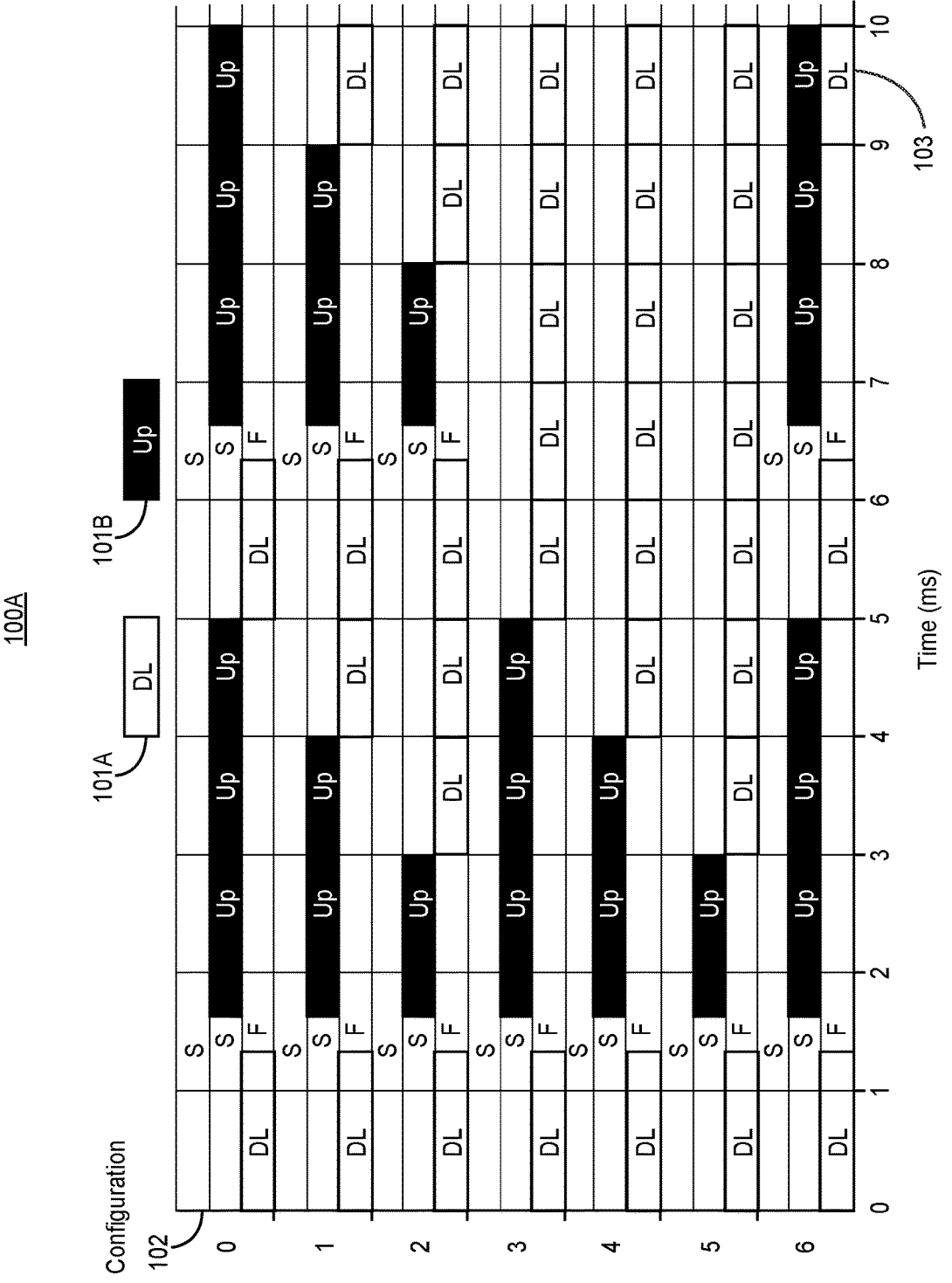
FIG. 1A illustrates a diagram of one embodiment of exemplary TDD frame configurations during one TDD frame.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Many radios utilized in communications systems (e.g., cellular communications systems, fixed wireless access communications systems, and cellular backhaul communications systems) employ time division duplexing (TDD). Radios which employ TDD are referred to herein as TDD radios. Embodiments of the present invention provide techniques for enhancing power efficiency, and thus diminishing power loss, in a DC voltage converter used to supply power to a TDD radio in a radio system. The TDD radio is a radio configured to use TDD.

TDD radios transmit and received during TDD frames. Each TDD frame comprises at least one downlink subframe and at least one uplink subframe. A downlink subframe is a period in time when data is transmitted from the radio to another radio, e.g., user equipment. An uplink subframe is a period of time when data received by the radio from the other radio, e.g., the user equipment. Typically, the radio transmits data during a downlink subframe. When the radio transmits data during each downlink subframe and receives during each uplink subframe, the radio typically consumes more DC power during the downlink subframe in comparison to an uplink subframe.

Each downlink subframe and each uplink subframe has a fixed time period, e.g., that is of one or more fixed time periods. The downlink and uplink subframes may have different time periods. Each TDD frame has a time period comprising a sum of the time periods of each of the uplink and downlink subframes which form the TDD frame. Optionally, the TDD frame comprises ten subframes each of which has a time period of one millisecond; thus, the TDD frame has a time period of ten milliseconds.

A DC-DC voltage converter having two or more phases is referred to herein as a multiphase DC-DC voltage converter, where each phase is configured to be enabled and disabled. The outputs of each phase are electrically connected, and thus each phase has a same DC voltage at its output. Optionally, each phase provides a same output DC current. When enabled, the phase provides DC output power. When disabled, the phase provides no DC output power.

When more output DC power is required from the multiphase DC-DC voltage converter, at least one addition phase of the multiphase DC-DC voltage converter is enabled. When less output DC power is required from the multiphase DC-DC voltage converter, at least one addition phase of the multiphase DC-DC voltage converter is disabled. Because a multiphase DC-DC voltage converter is configured to operate with a variable number of phases whose number corresponds to a target or desired output DC power level, the multiphase DC-DC voltage converter has higher power efficiency in comparison to a single phase DC-DC voltage converter.

Efficiency of the multiphase DC-DC voltage converter is enhanced by enabling at least one additional phase of a multiphase DC-DC voltage converter preceding or upon commencement of transmission of a downlink subframe by the TDD radio, and disabling at least one phase of the multiphase DC-DC voltage converter upon or after the downlink subframe has been transmitted by the TDD radio.

In other words, when the TDD radio is transmitting, a number of phases—e.g., needed to provide at least a maximum DC power required by the TDD radio when transmitting a maximum amount of data in the downlink subframe—are utilized. The number of phases, i.e., more than one phase of the multiphase DC-DC voltage converter is enabled during a downlink subframe, e.g., to provide to at least a maximum DC power required by the TDD radio when the TDD radio is transmitting a maximum amount of data in the downlink subframe. The number of phases, i.e., one or more phases, utilized when the TDD radio is receiving during an uplink subframe corresponds to at least a maximum amount of power which may be drawn by the TDD radio when the TDD radio is receiving. Optionally, the number of phases utilized by the TDD radio when the TDD radio is transmitting is greater than the number of phases utilized by the TDD radio when the TDD radio is receiving. Using embodiments of the invention, the efficiency of the multiphase DC-DC voltage converter is enhanced when providing DC power to a TDD radio in comparison to when a single phase DC-DC voltage converter is utilized to provide DC power to the TDD radio.

The multiphase DC-DC voltage converter may be a buck, boost, or buck-boost converter. Optionally, each phase of the multiphase DC-DC voltage converter is configured to deliver an equal amount of DC power, e.g., DC current and DC voltage, at an output of the corresponding phase. Optionally, e.g., when the multiphase DC-DC voltage converter is remotely located from the radio, the DC power provided from the multiphase DC-DC voltage converter must be equal to or greater than a sum of the DC radio power consumed at the period of time and the power dissipated in the conductors electrically connecting the DC voltage converter to the radio.

Optionally, a scheduler is configured to provide (a) a TDD frame configuration type and/or data describing the TDD frame configuration type, and (b) a reference time. A baseband unit, e.g., a virtual baseband unit, or another component of the radio access network (RAN) comprises the scheduler. The scheduler stores a TDD frame configuration utilized by the radio. Based upon the TDD frame configuration, the scheduler ensures that time and frequency blocks (a) in a downlink subframe are allocated to a receiving user equipment communicatively coupled to a TDD radio, and (b) in an uplink subframe are allocated to a transmitting user equipment communicatively coupled to the TDD radio.

Optionally, there are two or more, e.g., seven, TDD frame configurations which may be used by the radio. TDD frame configuration of a radio may change over time. Each TDD frame configuration specifies a TDD frame, i.e., specifies a unique sequence of downlink subframes and uplink subframes and optionally the time duration of each of such subframes comprising the sequence; if the time duration of each subframe is not specified then it is otherwise known. Optionally, some TDD frames have more downlink subframes than uplink subframes or vice versa.

FIG. 1A illustrates a diagram of one embodiment of for exemplary TDD frame configurations during one TDD frame 100A. FIG. 1A illustrates seven TDD frame configurations 102. Each TDD frame configuration includes downlink subframes 101A and uplink (UL or Up) subframes 101B over time 103.

The reference time is a time when a TDD frame commences in the past, present, or future, or from which such time can be derived. The period of each TDD frame comprising a TDD frame configuration is equal, and known. Optionally, a period of each TDD frame comprising each TDD frame configuration is equal. Optionally, the time period of each subframe, comprising a TDD frame of each TDD frame configuration, is known. Thus, with knowledge of the reference time and knowledge of a time period of each TDD frame, a start time (or start time) of each frame can be determined, e.g., by the multiphase DC-DC voltage converter. As a result, during each downlink subframe, the multiphase DC-DC voltage converter can enable a first number of phases of the multiphase DC-DC voltage converter needed to provide at least a maximum DC power drawn by the TDD radio when transmitting. During each uplink subframe, the multiphase DC-DC voltage converter can enable a second number of phases of the multiphase DC-DC voltage converter needed to provide at least a maximum amount of power drawn by the TDD radio when the TDD radio is receiving.

For pedagogical purposes, a radio access network illustrated herein is a 5G radio access network configured to satisfy the open radio access network (O-RAN) Alliance specifications ("O-RAN specifications"). However, embodiments of the invention may be used to implement other types of radio access networks (e.g., other types of cellular systems or fixed wireless access systems). Thus, for pedagogical purposes, the radio illustrated herein is an O-RAN compliant radio unit (O-RAN radio unit or O-RU) and the baseband unit illustrated herein is virtual baseband unit, e.g., comprising an O-RAN compliant distributed unit (O-DU) and an O-RAN compliant central unit (O-RAN central unit or O-CU). However, in other embodiments of the invention, the radio and/or the baseband unit can be compliant with other standards, and thus may not be an O-RU, an O-DU, and/or an O-CU. Also, a physical baseband unit can be used in lieu of a virtual baseband unit.

The O-RAN specifications include without limitation the O-RAN fronthaul working group control, user and synchronization plane specification (ORAN-WG4.CUS.0-V04.00) and O-RAN Alliance working group 4 management plane specification (ORAN-WG4.MP.0-v04.00.00); these O-RAN specifications are hereby incorporated by reference herein in their entirety. The O-RAN specifications permit interoperability of RAN components, e.g., an O-RU, an O-DU, and an O-CU, made by different vendors. An O-RU is a specific type of radio illustrated herein for pedagogical purposes. The O-RU converts received wireless signals into data which can be sent over a packet network to the O-DU, and converts data received from the O-DU over a packet network to a signal that is wirelessly broadcast. For purposes of clarity, the embodiments of the invention are illustrated as being implemented with an O-RU; however, embodiments of the invention may be implemented with any type of radio. Thus, wherever the term O-RU is used, the term radio may be used in its place.

Optionally, the virtual baseband unit comprises an O-DU and an O-CU. The O-DU and O-CU perform functions of a baseband unit (BBU) and each may be executed on a same or different server system, e.g., local server network(s)

and/or cloud computing system(s). Optionally, the O-DU is executed on a server system co-located with the O-RU, e.g., at the site of the O-RU, and the O-CU is executed on a cloud computing system remotely located, e.g., distant, from the site of the O-RU. Pursuant to the O-RAN specifications, O-RAN components utilize message protocols to communicate amongst themselves.

A virtual baseband unit means a baseband unit configured to be executed on server(s) and/or in a cloud computing system, and to be communicatively coupled to at least one radio. A virtual baseband unit processes, e.g., encodes baseband data received from a radio and decodes data sent to the radio. The virtual baseband unit and radio(s) are components of a radio system. For purposes of clarity, the embodiments of the invention are illustrated as being implemented with a virtual baseband, e.g., using an O-DU and a O-CU; however, embodiments of the invention may be implemented with any type of baseband unit. Thus, wherever term(s) virtual base band, O-DU, and/or O-CU are used, the term baseband unit may be used in the alternative.

A virtual baseband unit performs some or all of the functions described above and attributed to the O-DU and O-CU. The virtual base band is communicatively coupled, e.g., through the O-CU, to a core network. The virtual baseband unit and radio(s) are components of a communications system such as a cellular communications system and/or a fixed wireless access communications system that provides point to point communications. Thus, the RAN provides a wireless communications link between the core network and other radio(s), e.g., user equipment.

Communications between RAN components, e.g., a virtual baseband unit and another RAN component (e.g., the multiphase DC-DC voltage converter) are facilitated using an input/output (I/O) data protocol. The I/O data protocol is a protocol used to convey messages, e.g., in a user plane, a control plane, a synchronization plane, and/or a management plane; however, one or more alternative planes may be used in lieu of the foregoing. IEEE1914.3 compliant communications protocol, Common Public Radio Interface (CPRI), Enhanced CPRI (eCPRI) are examples of I/O data protocols; however, other I/O data protocols may be used. Optionally, communications between a virtual baseband unit comprising the scheduler and a multiphase DC-DC voltage converter are facilitated using an input/output (I/O) data protocol used by the virtual baseband unit and the multiphase DC-DC voltage converter.

Each message protocol has a format, i.e., a syntax with one or more variables. Data about TDD frame configuration (e.g., TDD frame configuration type, and/or TDD frame time length and/or a number and relative location (with respect to time) of downlink and uplink subframes in the TDD frame configuration type) and reference time may be obtained by the multiphase DC-DC voltage converter from the scheduler in a message from the virtual baseband unit (e.g., from the O-DU or O-CU) after the multiphase DC-DC voltage converter sends the virtual baseband unit a message requesting such information. Alternatively, the scheduler may send, e.g., periodically, such data about the TDD frame configuration and the reference time to the multiphase DC-DC voltage converter without receiving a message from the multiphase DC-DC voltage converter requesting such data.

Embodiments of the present invention utilize a multiphase DC-DC voltage converter used to supply power to a radio of a radio access network. Optionally, each phase of the multiphase DC-DC voltage converter is configured to deliver an equal amount of DC power, e.g., DC current, at an output of the corresponding phase; thus, optionally, each phase may be of the same design. By disabling phases as output power requirements decline, the enabled phases operate with a higher power efficiency. Efficiency of a phase may be determined by power output of the phase divided by power input of the phase. Power loss of a phase means power output of the phase less power input of the phase. At higher efficiency levels, each phase has a lower power loss. Efficiency of the multiphase DC-DC voltage converter may be determined by power output of the multiphase DC-DC voltage converter divided by power input of the multiphase DC-DC voltage converter.

Enabling a phase means that the phase is configured to provide DC power, e.g., to the radio. Disabling a phase means that the phase is no longer configured to provide DC power to the radio, and thus generates little or no DC power loss. If all phases were used at all times, then the multiphase DC-DC voltage converter would have decreased efficiency when the radio drew relatively little DC power, e.g., during radio reception. Therefore, it is desirable to enable a number of phases that substantially maximizes efficiency of the multiphase DC-DC voltage converter depending upon an amount of DC power drawn by a radio whose DC power is supplied by the multiphase DC-DC voltage converter. The DC power drawn by a TDD radio varies depending upon whether the TDD radio is transmitting during a downlink subframe (when the radio draws higher DC power) or receiving during an uplink subframe (when the TDD radio draws lower DC power). Thus, optionally, the number of phases may be varied to enhance multiphase DC-DC voltage converter efficiency. More phases of the multiphase DC-DC voltage converter are enabled during a downlink subframe to increase the efficiency of the multiphase DC-DC voltage converter. Fewer phases of the multiphase DC-DC voltage converter are enabled during an uplink subframe to increase efficiency of the multiphase DC-DC voltage converter.

Figure 1B:
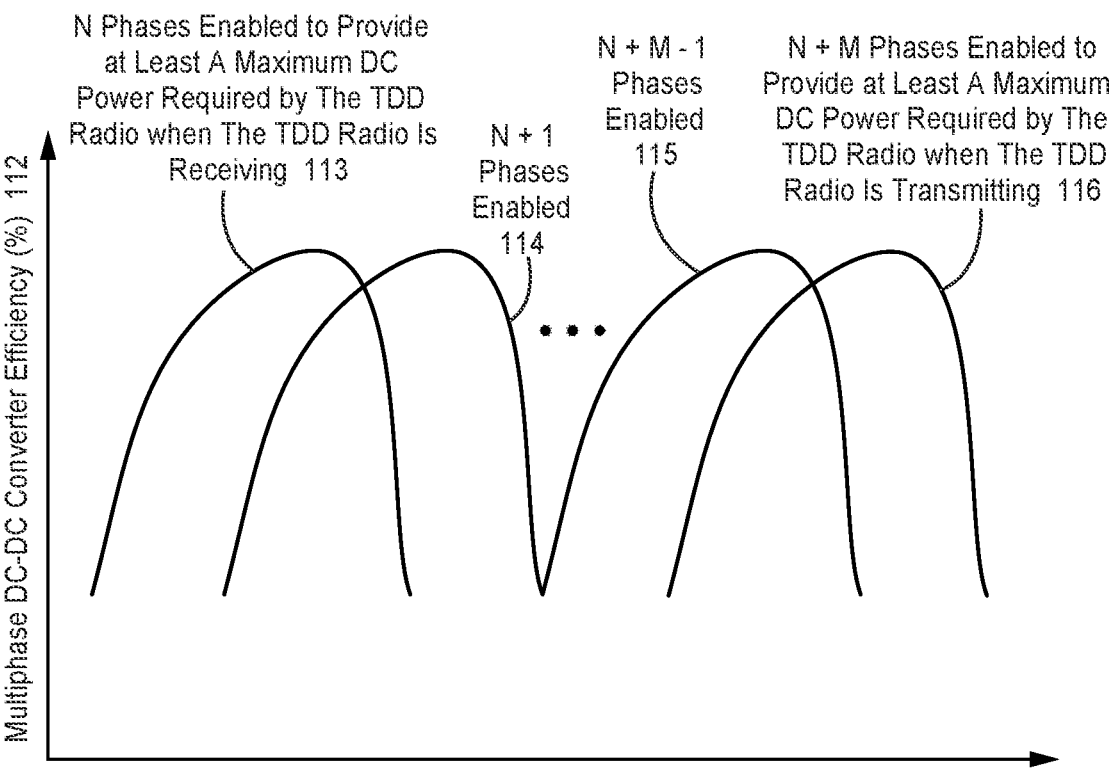
FIG. 1B illustrates a diagram of one embodiment of multiphase DC-DC converter efficiency versus output current of multiphase DC-DC converter efficiency.

FIG. 1B illustrates a diagram of one embodiment of multiphase DC-DC converter efficiency 112 versus output current 110 of multiphase DC-DC voltage converter efficiency 100B. During a downlink subframe, a TDD radio will typically consume significantly higher DC power than during a time outside of the downlink subframe, e.g., during an uplink subframe or special subframe (described elsewhere herein). TDD radio DC power consumption in increased during a TDD downlink subframe due to power consumption of TDD radio's power amplifier(s) used to increase the power level of downlink signals transmitted by the TDD radio and emitted by antenna(s) coupled thereto. Thus, the TDD radio draws higher DC power from the multiphase DC-DC power supply during the downlink subframe than during the time outside of the downlink subframe. Correspondingly, the TDD radio draws higher direct current from the multiphase DC-DC power supply during the downlink subframe than during the time outside of the downlink subframe. To enhance power efficiency of the multiphase DC-DC power supply during the downlink subframe and during time period(s) outside of the downlink subframe, then (a) a number of phases (or N+M phases) 116 of the multiphase DC-DC power supply which provide at least a maximum DC power which required by the TDD radio when the TDD radio is transmitting a maximum amount of data are enabled during the downlink subframe, and (b) a number of phases (or N phases) of the multiphase DC-DC power supply which provide at least a maximum DC power required by the TDD radio when the TDD radio is receiving (or a maximum DC power potentially required by the TDD radio when the TDD is receiving) 113 are enabled outside of the downlink subframe. Variables N and M are each an integer greater than zero. This concept is illustrated in FIG. 1B. Thus, variable M may be one, two, three, etc. For pedagogical purposes, FIG. 1B illustrates an embodiment with at least two additional phases, and thus where M is greater than or equal to two.

Optionally, there may be any integer number of other number of phases which can be enabled that are less than the N+M phases and greater than the N phases. FIG. 1B illustrates two examples: N+1 phases enabled 114 and N+M−1 phases enabled 115.

Figure 2A:
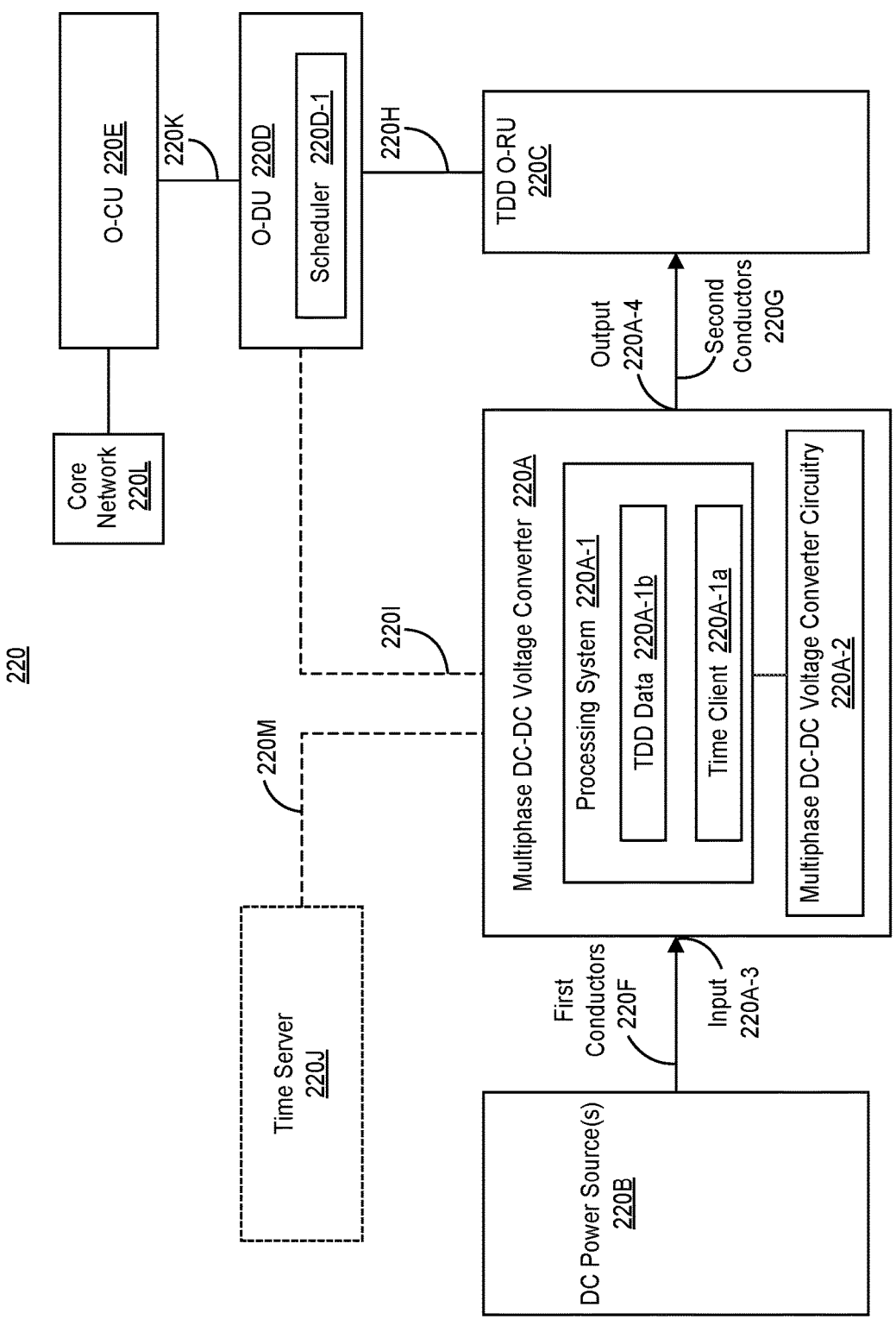
FIG. 2A illustrates a block diagram of one embodiment of a radio access network.

FIG. 2A illustrates a block diagram of one embodiment of a radio access network (RAN) 220. The RAN 220 comprises a TDD O-RU 220C, an O-DU 220D, an O-CU 220E. a multiphase DC-DC voltage converter 220A, and at least one DC power source (DC power source(s)) 220B. Optionally, the DC power source(s) 220B comprise at least one of an alternating current (AC) to direct current (DC) (AC/DC) power supply, at least one battery, and/or any other type of DC power source, e.g., solar cells. The DC power source(s) 220B are electrically connected to a DC power input (input) 220A-3 of the multiphase DC-DC voltage converter 220A through first electrical conductors (first conductors) 220F; the first electrical conductors 220F are configured to provide DC power from the DC power source(s) 220B to the multiphase DC-DC voltage converter 220A.

A DC power output (output) 220A-4 of the multiphase DC-DC voltage converter 220A is electrically connected to, e.g., a DC power input of, the TDD O-RU 220C through second electrical conductors (second conductors) 220G. Each of the first electrical conductors 220F and the second electrical conductors 220G may comprise power cable(s), bus bar(s), wire(s) and/or other type of electrical conductors.

In a 5G radio access network designed according to the O-RAN specifications, the radio access network 220, includes an O-DU 220D configured to be coupled to at least one TDD O-RU 220C through a fronthaul gateway (FHG) communications link 220H compliant with the O-RAN specifications. The fronthaul gateway communications link 220H may be implemented with internet protocol and/or Ethernet networking technology. For pedagogical purposes, FIG. 2A illustrates a RAN 220 comprising a single TDD O-RU 220C communicatively coupled to an O-DU 220D. Further, an O-CU 220E is communicatively coupled to the O-DU 220D and a core network 220L. The O-CU 220E is communicatively coupled to the O-DU 220D through a first data link 220K For pedagogical purposes, the scheduler 220D-1 is illustrated as being part of the O-DU 220D. However, the scheduler 220D-1 may be located in a different component of the RAN 220, including for example the O-CU 220E. The scheduler 220D-1 and the time client 220A-1c may each be implemented in software executed on a processing system (or processing circuitry).

Optionally, a component of the RAN 220 (e.g., the O-DU 220D or the O-CU 220E) comprising the scheduler or communicatively coupled to another component of the RAN which comprises the scheduler is communicatively coupled to the multiphase DC-DC voltage converter 220A. For pedagogical purposes, the O-DU 220D of FIG. 2A is illustrated as both being communicatively coupled to the multiphase DC-DC voltage converter 220A through a second data link 220I and comprising the scheduler 220D-1. Optionally, one or both of the first data link 220K and the second data link 220I are an internet protocol network data link. Optionally, the scheduler 220D-1 is configured to provide, e.g., periodically, a TDD frame configuration of the TDD O-RU 220C to the multiphase DC-DC voltage converter 220A and/or the multiphase DC-DC voltage converter 220A is configured to request (and thus subsequently receive) from the scheduler 220D-1 the TDD frame configuration of the TDD O-RU 220C.

Downlink data to be sent to user equipment (wirelessly communicatively coupled to the TDD O-RU 220C) is sent from the core network 220L through the O-CU 220E and/or the O-DU 220D to the TDD O-RU 220C. Uplink data sent from such user equipment (wirelessly communicatively coupled to the TDD O-RU 220C) is sent from the TDD O-RU 220C through the O-DU 220D and/or the O-CU 220E to the core network 220L.

The O-DU 220D is configured to host radio link control (RLC), medium access control (MAC), and upper physical (Upper PHY) layers. Optionally, the O-DU is configured to host higher layer protocols, e.g., radio resource control, service data adaption protocol (SDAP), and packet data convergence protocol (PDCP); optionally, one or more of these services can be implemented the O-CU 220E. The O-DU 220D is further configured to provide frequency domain baseband data, e.g., having in-phase and quadrature phase (I and Q) components. Thus, the O-DU 220D has some functionality similar to 2G, 3G and/or 4G virtual baseband unit(s).

A data interface of the O-DU 220D (or O-DU interface) is configured to be coupled to either the O-CU 220E or a core network 220L. The O-CU is configured to be coupled between the O-RAN distributed unit and the core network 220L. Optionally, the O-DU 220D and/or the O-CU 220E are configured to be implemented in software executed on a server (or server circuitry) or a cloud computing system (or cloud computing system circuitry). Uplink and downlink data communicated through the O-DU interface comprises data in a user plane (U), a control plane (C), a synchronization plane(S), and/or a management plane (M). User plane data comprises voice and/or data transmitted to and from user equipment coupled to radio(s) of the RAN. Control plane data comprises messages used to control how a corresponding radio (receiving the control plane data) processes user plane In-phase and Quadrature-phase data stream in the uplink and downlink paths in real time. Synchronization plane data comprises data for synchronization and timing information between nodes (e.g., between a virtual baseband unit and a radio or between a modified fronthaul gateway and either a virtual baseband unit or a radio) of a RAN. Management plane data comprises data for operation, administration, and maintenance of radio(s), where such operation, administration, and maintenance are not required in real time. The control, synchronization, and/or management planes are bidirectional. Thus, a ping or a query sent in a one of the control, synchronization, and/or management plane in the downlink path may result in acknowledgement and/or responsive data the same plane in the uplink path.

Optionally, a TDD O-RU 220C may be mounted on, e.g., at or near a top of, a mounting structure, e.g., a tower and/or another form of a mounting structure. DC power is electrically coupled from the DC power source(s) 220B to the TDD O-RU 220C through the multiphase DC-DC voltage converter 220A.

Optionally, the TDD O-RU 220C is communicatively coupled to the O-DU 220D through the fronthaul gateway communications link 220H; alternatively, the TDD O-RU 220C may be communicatively coupled to the O-DU 220D through another type of communications link, such as an internet protocol communications link. The O-DU 220D is configured to send downlink data to the TDD O-RU 220C. The TDD O-RU 220C is configured to send uplink data to the O-DU 220D.

Optionally, the multiphase DC-DC voltage converter 220A is communicatively coupled to a component of the RAN 220 through a second data link 220I, e.g., an Ethernet network. For pedagogical purposes, the multiphase DC-DC voltage converter 220A is illustrated as being communicatively coupled to the O-DU 220D by the second data link 220I. However, the multiphase DC-DC voltage converter 220A may be optionally communicatively coupled through another communications link to another component (e.g., the O-CU 220E) of the RAN 220

The multiphase DC-DC voltage converter 220A comprises a processing system (or processing circuitry) 220A-1 communicatively coupled to multiphase DC-DC voltage converter circuitry (or multiphase DC-DC voltage conversion circuitry) 220A-2. For pedagogical purposes, the processing system 220A-1 is illustrated as comprising an optional time client 220A-1a and optional TDD data 220A-1b. The processing system 220A-1 is configured to store and execute the time client 220A-1a and to store the TDD data 220A-1b.

Timing of the processing system 220A-1 must be synchronized with the RAN 220, e.g., the scheduler 220D-1. Typically, timing of components in the RAN 220, e.g., the scheduler 220D-1 and multiphase DC-DC voltage converter 220A (e.g., the time client 220A-1a of the processing system 220A-1), are synchronized within one hundred nanoseconds or less, using synchronous Ethernet (SynchE) or precision time protocol (PTP). SynchE is compliant with International Telecommunications Union (ITU) Telecommunication standardization sector recommendations G.8261, G.8262, and G.8264. PTP is compliant with Institute of Electrical and Electronics Engineers (IEEE) standard 1588. Clocks used for synchronization may be located at the baseband unit (e.g., virtual baseband unit), elsewhere in the RAN 220, elsewhere in a larger network including the RAN 220, and/or external to the RAN 220 and the larger network. Optionally, the multiphase DC-DC voltage converter 220A may be communicatively coupled to a time server 220J, through a third data link 220M. The time server 220J is external to the RAN 220. Optionally, the time server 220J is a U.S. National Institutes of Standards and Technologies time server. The time server 220J or clock in the RAN may be generally referred to as a time source. Thus, the processing system 220A-1 of the multiphase DC-DC voltage converter 220A comprises the time client 220A1-c configured to derive time accuracy similar to the time accuracy of the RAN 220 and its components so that the processing system 220A-1 can be synchronized in time with the TDD O-RU 220C. As a result, the multiphase DC-DC voltage converter is configured to provide higher DC power to the TDD O-RU 220C during downlink subframes and lower DC power to the TDD O-RU 220C during uplink subframes.

In one embodiment, the multiphase DC-DC voltage converter 220A is configured to receive—a TDD frame configuration and the time reference of the O-RU 220C—from the scheduler 220D-1. In this embodiment, the multiphase DC-DC voltage converter 220A, e.g., the time client 220A-1a, is configured to synchronize time with the RAN 220 utilizing a clock in the RAN 220 or utilizing the time server 220J.

The received TDD frame configuration is a unique sequence of downlink subframes and uplink subframes and the time duration of each of such subframe comprising the sequence. In this embodiment, the TDD data 220A-1b compromises the received TDD frame configuration and received time reference of the O-RU 220C. Alternatively, the received TDD frame configuration may be an identifier, e.g., an alphanumeric designator, indicating a specific TDD frame configuration. In this alternative case, the TDD data 220A-1b compromises each TDD frame configuration (including the unique sequence of downlink subframes and uplink subframes and the time duration of each of such subframe comprising the sequence) and the identifier for each such TDD frame configuration. Optionally, each TDD frame configuration and the identifier for each such TDD frame configuration may be stored in a database, a lookup table, etc. in the TDD data 220A-1b. The processing system 220A-1 would then be configured to determine the TDD frame configuration (including the unique sequence of downlink subframes and uplink subframes and the time duration of each of such subframes comprising the sequence) by matching the received identifier to a same identifier stored in the TDD data 220A-1b.

In an alternative embodiment, the multiphase DC-DC voltage converter 220A does not receive information about the TDD frame configuration and the time reference from the scheduler 220D-1. Rather, in a calibration mode, the multiphase DC-DC voltage converter 220A independently determines the TDD frame configuration and reference time of the O-RU 220C. As described elsewhere herein, the time client 220A-1a synchronizes time with another component of the RAN 220 or an external time server (time server) 220J. Also in the calibration mode, for a time period of one or more, e.g., two or more, TDD frames, the processing system 220A-1 is configured to enable a first number of phases, in the multiphase DC-DC voltage converter circuitry 220A-2, which provides at least a maximum DC power required by the TDD radio when the TDD radio is transmitting a maximum amount of data during the downlink subframe. Direct current (measured periodically over the one or more TDD frames at the output of the multiphase DC-DC voltage converter) and each measurement of direct current is measured is stored in the TDD data 220A-1b. Optionally, the TDD data 220A-1b also stores known TDD frame configurations. Optionally, the TDD data 220A-1b also stores a correlation or another algorithm used to determine TDD configuration type and a reference time. Using the stored known TDD frame configurations and the stored measured direct current, the processing system 220A-1 executes the algorithm to determine the TDD frame configuration and the reference time. Optionally, the algorithm is a correlation algorithm which correlates the direct current measured during the one or more TDD frames with each known TDD frame configuration. For each known TDD frame configuration, a downlink subframe corresponds to a large current level and an uplink subframe corresponds to a low current level, wherein the large current level is larger than the low current level. The correlation algorithm identifies a TDD frame configuration having a largest correlation value and also determines the time reference using the time of each direct current measurement. Optionally, the received or identified (a) TDD frame configuration or identifier and (b) the time reference may be stored in the TDD data 220A-1b. Optionally, the algorithm determines that a current level greater than or equal to a current threshold level is a downlink subframe, and a current level less than the current threshold level is an uplink subframe.

Figure 2B:
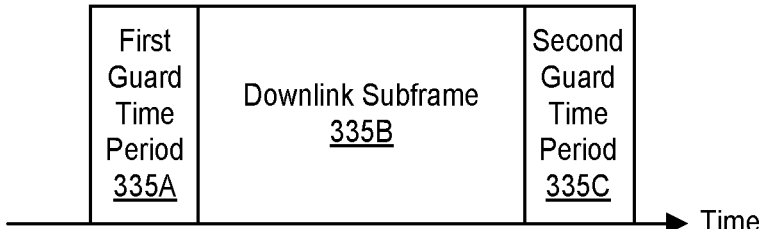
FIG. 2B illustrates a first guard time period and a second guard time period respectively before and after a downlink subframe.

Regardless as to how the TDD frame configuration is determined, as discussed elsewhere herein, using the time reference, the processing system 220A-1 is further configured to determine the start and stop times of each subframe of received or identified TDD frame configuration. Optionally, guard time periods are utilized to ensure that the multiphase DC-DC voltage converter 220A is configured to provide needed DC power during each downlink subframe. FIG. 2B illustrates a first guard time period 335A and a second guard time period 335C respectively before and after a downlink subframe 335B. Optionally, each of the first and the second guard time period is 1 millisecond. Upon commencement of the first guard time period 335A prior to commencement of each downlink subframe 335B and upon completion of the second guard time period 335C following an end of each downlink subframe 335B, the processing system 220A-1 is configured to enable a first number of phases, in the multiphase DC-DC voltage converter circuitry 220A-2, which the provide at least a maximum DC power required by the TDD radio when the TDD radio is transmitting a maximum amount of data during the downlink subframe. During the remaining periods of time, e.g., during portions of the uplink subframes, the processing system 220A-1 is configured to enable a second number of phase(s), in the multiphase DC-DC voltage converter circuitry 220A-2, which provide at least a maximum amount of power drawn by the TDD radio when the TDD radio is receiving during the uplink subframe. The first number of phases is greater than the second number of phase(s). The first guard time period 335A may be equal to or different from the second guard time period 335C. Optionally, the second guard time period 335C may be or at least include a special subframe (SSF), illustrated in FIG. 1A. The special subframe provides time for each user equipment (UE) scheduled to transmit in the following uplink subframe to implement an offset transmission time, e.g., determined by the O-DU 220D, for the UE. Each UE's offset transmission time is used to align the UE's uplink transmission to compensate for the UE's physical distance from the TDD O-RU 220C. As a result, uplink transmissions, in a same resource block, by different UEs at different distances from the TDD O-RU 220C are received by the TDD O-RU 220C at the same time. Optionally, when the TDD O-RU 220C is operating during a special subframe, and thus neither transmitting nor receiving, then the multiphase DC-DC voltage converter 220A is configured to utilize the same number of phases as when the TDD O-RU 220C is receiving. However, if the second guard time period 335C partially or completely overlaps the special subframe, then during such overlap, the multiphase DC-DC voltage converter 220A is configured to utilize the same number of phases as when the TDD O-RU 220C is transmitting.

Optionally, the multiphase DC-DC voltage converter 220A is configured to decrease or increase a first DC voltage level provided at an input (or input conductors) 220A-3 of the multiphase DC-DC voltage converter 220A to a second voltage level at an output (or output conductors) 220A-4 of the multiphase DC-DC voltage converter 220A. In one embodiment, the multiphase DC-DC voltage converter 220A is located proximate to the DC power source(s) 220B and remotely located from the TDD O-RU 220C. In this embodiment, the multiphase DC-DC voltage converter 220A is configured to boost a lower voltage, e.g., a positive or negative 40-56V, to a higher voltage, e.g., respectively a positive or negative 54-60V. Boosting the lower voltage to a higher voltage, decreases the current flow through the second electrical conductors 220G to diminish power dissipation in the second electrical conductors 220G. Optionally, in this configuration, the multiphase DC-DC voltage converter circuitry 220A-2 may be implemented with a multiphase boost voltage converter circuitry. Techniques for boosting a voltage provided to a radio are described in U.S. Pat. No. 9,448,576, which is hereby incorporated by reference herein in its entirety.

In another embodiment, the multiphase DC-DC voltage converter 220A is located remote from the DC power source(s) 220B and proximate the TDD O-RU 220C. In this embodiment, the multiphase DC-DC voltage converter 220A is configured to reduce a higher voltage, e.g., positive or negative 100-320V, provided at the input 220A-3 to a lower voltage, e.g., positive or negative 40-56V, provided at the output 220A-4. The higher voltage decreases the current flow through the first electrical conductors 220F to diminish power dissipation in the first electrical conductors 220F. Optionally, in this configuration, the multiphase DC-DC voltage converter circuitry 220A-2 may be implemented with a multiphase buck voltage converter circuitry.

Figure 3:
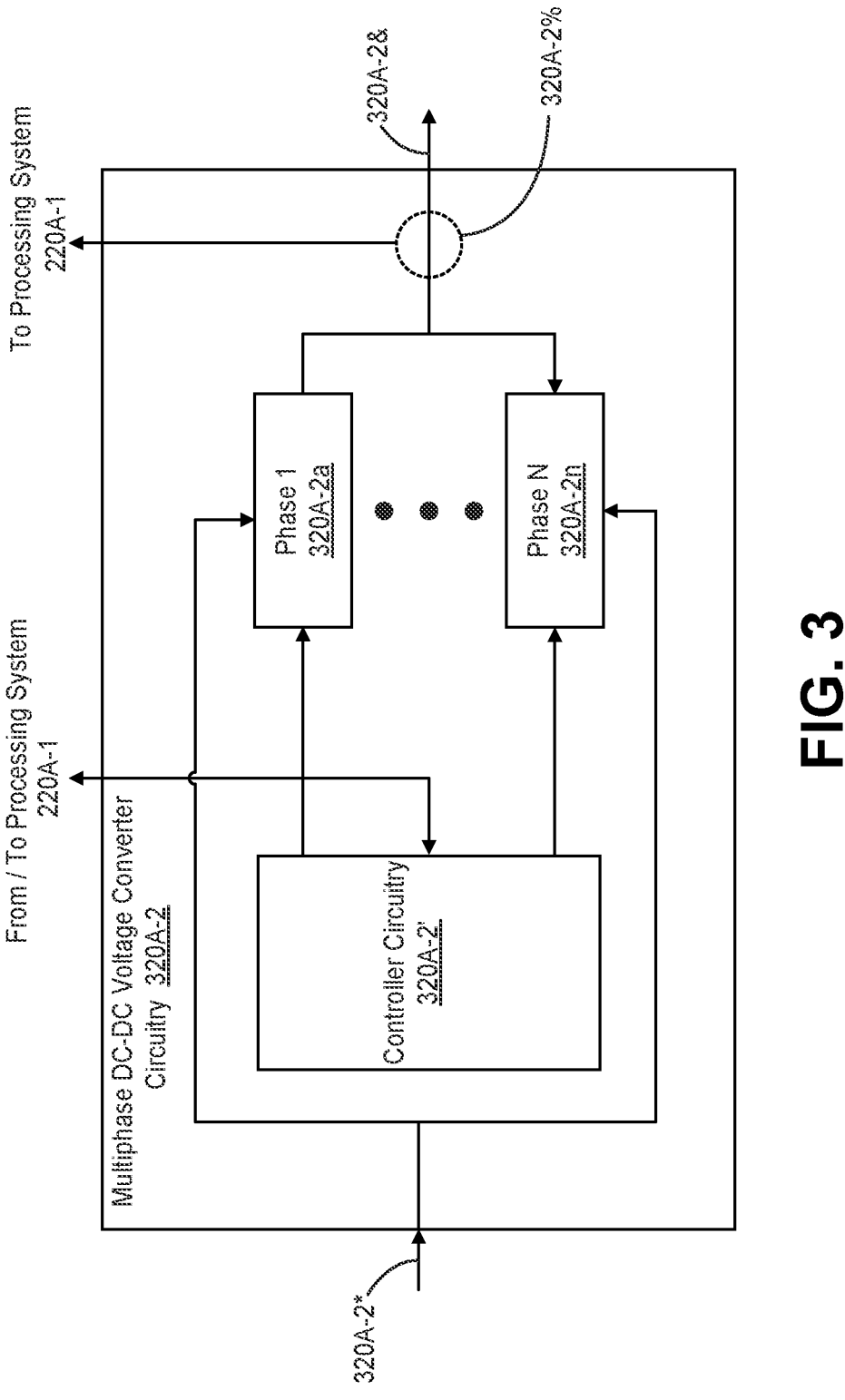
FIG. 3 illustrates one embodiment of a block diagram of a multiphase DC-DC voltage converter circuitry.

FIG. 3 illustrates one embodiment of a block diagram of a multiphase DC-DC voltage converter circuitry 320A-2. The multiphase DC-DC voltage converter circuitry 320A-2 comprises controller circuitry 320A-2' and N phases (or N phase circuits) 320A-2a, 320A-2n. The multiphase DC-DC voltage converter circuitry 320A-2 further comprises an input 320A-2\* and an output 320A-2. The controller circuitry 320A-2' is configured to be communicatively coupled to the processing system 220A1. Optionally, the controller circuitry 320A-2' is configured to receive data from and/or provide data to the processing system 220A-1; optionally, received data maybe data indicative of a DC power output to be provided by the multiphase DC-DC voltage converter circuitry 320A-2 at about time of receipt of such data and/or data indicative of a number of phase(s) 320A-2a, 320A-2n to be enabled at about time of receipt of such data.

Optionally, the controller circuitry 320A-2' is configured to generate a pulse train signal using pulse width modulation. The controller 3210A-1 sets the pulse width of the pulse train to achieve a desired DC output voltage level at an output of each phase 320A-2a, 320A-2n (and thus an output (or output conductors 320A-4) of the multiphase DC-DC voltage converter circuitry 320A-2).

Optionally, an input of each phase 320A-2a, 320-2n is configured to be electrically coupled, through an input (or input conductors) 320A-3 of the multiphase DC-DC voltage converter circuitry 320A-2, to the DC power source(s) 220B. Optionally, each phase is functionally equivalent to every other phase. Optionally, each phase 320A-2a, 320A-2n comprises at least one switch, e.g., a field effect transistor, and a low pass filter. An input to the at least one switch is configured to receive the pulse train, and generate a corresponding pulse train at a higher voltage level at an output of the at least one switch. The output of the switch is coupled to the low pass filter. Optionally, the low pass filter comprises a series inductor electrically connected to at least one shunt capacitor. The low pass filter smooths the pulse train at the higher voltage level to the desired DC voltage level. The output of each phase 320A-2a, 320A-2n, e.g., of each low pass filter, is configured to be electrically coupled to the output 320A-4.

Phase(s) which are not enabled are disabled. Each phase provides an equal DC power, e.g., an equal DC current, output and equal DC voltage output. Determination of a number of phases to be enabled during a downlink subframe may be determined by ascertaining a number of phases, which when enabled, provides at least a maximum DC power required by the TDD radio when the TDD radio is transmitting a maximum amount of data in the downlink subframe. Determination of a number of phase(s) to be enabled during an uplink subframe may be determined by ascertaining a number of phase(s), which when enabled, provides at least a maximum DC power required by the TDD radio when the TDD radio is receiving data in the uplink subframe.

Optionally, the multiphase DC-DC voltage converter circuitry 320A-2 comprises a current sensor 320A-2% which is configured to measure the current at the output 320A-2& of the multiphase DC-DC voltage converter circuitry 320A-2 and thus the output 220A-4 of the multiphase DC-DC voltage converter 220A. The current sensor 320A-2% is configured to be communicatively coupled to the processing system 220A-1 and to provide a measured current level at the output 320A-2% to the processing system 220A-1. Thus, the current sensor 320A-2\* is configured to measure current at the output 220A-4 of the multiphase DC-DC voltage converter 220A. Optionally, the current sensor 320A-2% may be a Hall effect sensor or a resistive current sensor circuit.

Optionally, when the multiphase DC-DC voltage converter circuitry 320A-2 comprises the current sensor 320A-2%, current measurements can be used to adjust a number of phases of the multiphase DC-DC voltage converter circuitry 320A-2 which are enabled during a downlink subframe 101A to increase, e.g., maximize, multiphase DC-DC converter efficiency 112. For example, if after commencement of a downlink subframe, the TDD radio is not transmitting a maximum amount of data during downlink subframe 101A, the TDD radio may draw a reduced amount of direct current from the multiphase DC-DC voltage converter; in such a case the number of enabled phases may be reduced to enhance, e.g., maximize, multiphase DC-DC voltage converter efficiency from N+M phases 116 to, e.g., N+M−1 phases 115, N+1 phases 114, or some other number of enabled phases, depending upon the amount of direct current drawn by the TDD radio from the multiphase DC-DC voltage converter. If during the same subframe, the amount of direct current drawn by the TDD radio form the multiphase DC-DC voltage converter increases, the number of enabled phases may be increased to enhance, e.g., maximize, multiphase DC-DC voltage converter efficiency. The aforementioned techniques may be optionally applicable during an uplink subframe if an amount of direct current drawn by the TDD radio from the multiphase DC-DC voltage converter after commencement of the uplink subframe is less than the maximum DC power required, e.g., an expected amount of DC power, by the TDD radio when the TDD radio is receiving.

Optionally, the processing system 220A-1 can store information identifying a range of multiphase DC-DC voltage converter output current 110 with respect to a number of phases enabled, e.g., as pictorially illustrated in FIG. 1B. Optionally, the processing system 220A-1 is configured receive the measured current, and use the measured current to determine a number of phases to enable, e.g., during a downlink subframe 101A. Optionally, the processing system 220A-1 does so after before or upon commencement of the downlink subframe 101A and after initially enabling a number of phases which provide at least a maximum DC power required by the TDD when the TDD radio is transmitting.

Figure 4:
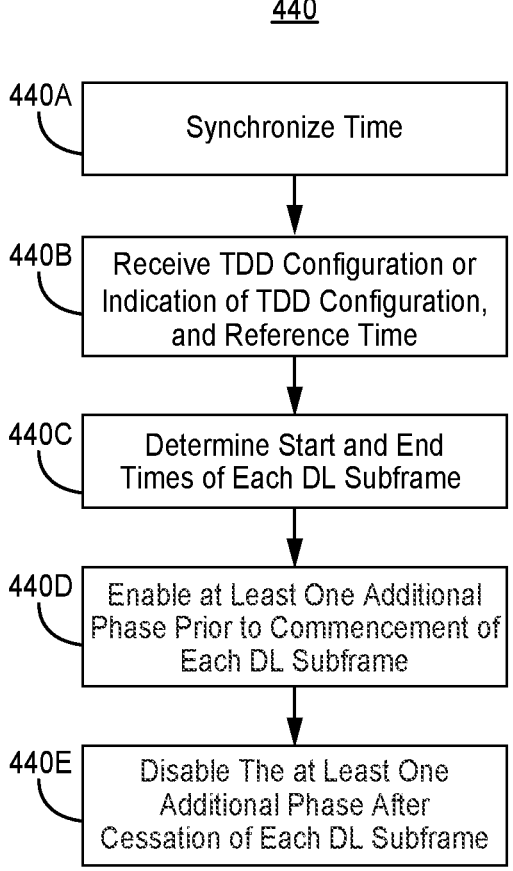
FIG. 4 illustrates a flow diagram of one embodiment of a method of providing DC power to a TDD radio.

FIG. 4 illustrates a flow diagram of one embodiment of a method 440 of providing DC power to a TDD radio. Method 440 may be implemented via the techniques described with respect to FIGS. 2 and 3, but may be implemented with other techniques as well; for pedagogical purposes, implementation of method 440 is described with respect to FIGS. 2 and 3. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 440A, time kept by a multiphase DC-DC voltage converter 220A, e.g., the time client, is synchronized with a component external to the multiphase DC-DC voltage converter 220A, e.g., a component of the RAN or a time server which is not part of the RAN. Thus, time kept by the multiphase DC-DC voltage converter 220A, e.g., by the processing system 220A-1, is synchronized with time of the RAN 220 or a network comprising the RAN. Optionally, the multiphase DC-DC voltage converter 220A, e.g., by the processing system 220A-1, receives time data utilizing conventional PTP and/or eSynch techniques. Optionally, block 440A, may be performed more than once, e.g., periodically and/or aperiodically.

In block 440B, a TDD frame configuration or indication of TDD frame configuration, and a reference time is received by the multiphase DC-DC voltage converter 220A from a component of a radio access network (RAN) external to the multiphase DC-DC voltage converter, e.g., from the scheduler. In block 440C, using at least one of the TDD frame configuration and the reference time, a start time and an end time, of each downlink subframe in a TDD frame, is determined.

In block 440D, using the determined start time of each downlink subframe of the TDD frame, during each downlink (DL) subframe of the TDD frame, at least one additional phase, of the multiphase DC-DC voltage converter 220A, is enabled. Optionally, a number of phases (including the at least one additional phase) of the multiphase DC-DC voltage converter 220A are enabled to provide at least a maximum power required by the TDD radio when the TDD radio is transmitting a maximum amount of data in the downlink subframe, are enabled. Optionally, the at least one additional phase which is enabled is enabled upon a commencement of a first guard time period preceding each downlink (DL) subframe 101A. An additional enabled phase is a phase which is enabled in addition to phases which were already enabled.

Optionally, after enabling at least one additional phase prior to commencement of each downlink subframe 101A, a total number of enabled phases may be varied, during a downlink subframe 101A, based upon measurements(s) of output current of the DC-DC voltage converter circuitry 320A-2 (as discussed elsewhere herein). This enhances efficiency of the DC-DC voltage converter during the downlink subframe 101A.

In block 440E, using the determined end time of each downlink subframe of the TDD frame, on or after completion of each downlink subframe of the TDD frame, the at least one additional phase in the multiphase DC-DC voltage converter 220A is disabled. Optionally, enable a number of phases of the multiphase DC-DC voltage converter 220A needed to deliver at least a maximum DC power required by TDD radio when the TDD radio receiving during an uplink subframe. Optionally, the at least one additional phase which is disabled is disabled upon completion of a second guard time period succeeding each downlink (DL) subframe. The first and the second guard time periods may be the same or different. Optionally, the first and the second guard time periods are a fraction of a time period of a downlink subframe.

Optionally, after enabling at least one additional phase prior to commencement of each uplink subframe 101B, a total number of enabled phases may be varied, during an uplink subframe 101B, based upon measurements(s) of output current of the DC-DC voltage converter circuitry 320A-2 (as discussed elsewhere herein). This enhances efficiency of the DC-DC voltage converter during the uplink subframe 101B.

Optionally, power dissipation of the second conductors may have to be accounted for when determining the DC power to be provided by the output of the multiphase DC-DC voltage converter—when the TDD radio and the multiphase DC-DC voltage converter are remote. Optionally, the TDD radio may be on a mounting structure, e.g., a tower, and the multiphase DC-DC voltage converter may be located at the base of the mounting structure. In such an event, the resistance of the second electrical conductors 220G electrically connecting the multiphase DC-DC voltage converter and the TDD radio are known, e.g., by measurement or by being determined through input provided by an entity, a user or another system. Further, a desired TDD radio input DC voltage is known; the multiphase DC-DC voltage converter is configured to maintain this desired TDD radio input DC voltage regardless of variations in DC voltage drop in the second conductors due to variations in current flow drawn by the TDD radio through the second conductors. The current flow through the second conductors at a time period, e.g., time block, can be determined with the current sensor 320A-2%. The DC voltage drop in the second conductors can be determined by multiplying the resistance of the second conductors by the measured current flow through the second conductors. The voltage provided by the output of the multiphase DC-DC voltage converter 220A can be increased by a voltage equal to or greater than the determined DC voltage drop. Alternatively, the voltage provided by the output of the multiphase DC-DC voltage converter 220A can be increased by a fixed voltage level. The foregoing may also apply to the method of FIG. 5.

Figure 5:
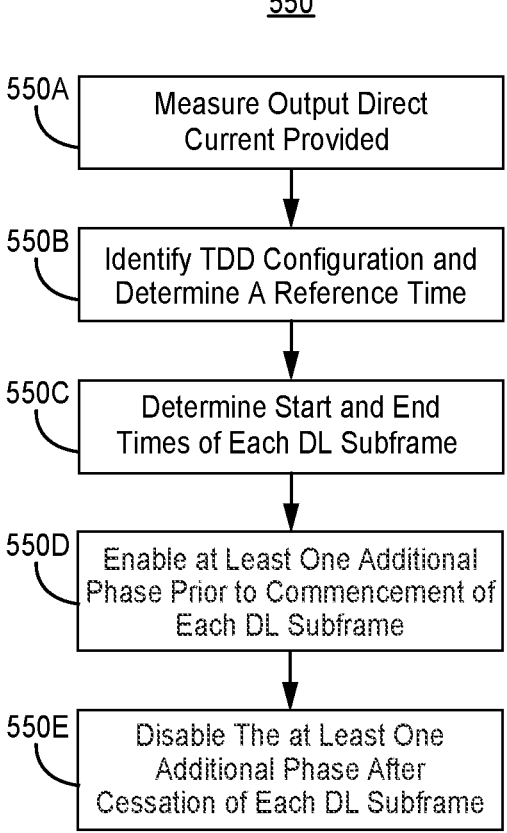
FIG. 5 illustrates a flow diagram of another embodiment of a method of providing DC power to a TDD radio.

FIG. 5 illustrates a flow diagram of another embodiment of a method 550 of providing DC power to a TDD radio. Method 550 may be implemented via the techniques described with respect to FIGS. 2 and 3, but may be implemented with other techniques as well; for pedagogical purposes, implementation of method 550 is described with respect to FIGS. 2 and 3. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

In block 550A, an output direct current is measured, e.g., at an output of the multiphase DC-DC voltage converter 220A, for a time period of one or more, e.g., two or more, TDD frames. Optionally, the output direct current is measured not just to determine TDD frame configuration as described elsewhere herein, but also during operation of the multiphase DC-DC voltage converter 220A during the course of a TDD frame as is further explained elsewhere herein.

In block 550B, using the measured direct current, a TDD frame configuration of the TDD radio and a reference time is determined; optionally, this determination is made using an algorithm, e.g., a correlation algorithm (described herein) or a pattern matching algorithm. Optionally, the algorithm determines that a current level greater than or equal to a current threshold level is a downlink subframe, and a current level less than the current threshold level is an uplink subframe.

In block 550C, using at least one of the TDD frame configuration and the reference time, a start time and an end time, for each downlink subframe of the determined TDD frame configuration, is determined. For at least this embodiment, the time period of each downlink subframe and each uplink subframe for each TDD frame configuration are known, and are stored, e.g., in the TDD data 220A-1a. For at least this embodiment, the relative start time (e.g., relative with respect to a start time or end time of the TDD frame) and the relative end time (e.g., relative with respect to a start time or end time of the TDD frame) of each downlink subframe and each uplink subframe for each TDD frame configuration are known and stored, e.g., in the TDD data 220A-1a. The relative start time and the relative end time of each downlink subframe is determined using a known time period of downlink subframe(s) and/or uplink subframe(s).

In block 550D, using the determined start time of each downlink subframe of the TDD frame, during each downlink (DL) subframe of the TDD frame at least one additional phase of the multiphase DC-DC voltage converter is enabled prior to commencement of each downlink subframe. Optionally, a number of phases (including the at least one additional phase) of the multiphase DC-DC voltage converter 220A are enabled to provide at least a maximum power required by the TDD radio when the TDD radio is transmitting a maximum amount of data in the downlink subframe, are enabled. Optionally, the at least one additional phase which is enabled is enabled upon a commencement of a first guard time period preceding each downlink (DL) subframe. An additional enabled phase is a phase which is enabled along with phases which were already enabled.

Optionally, after enabling at least one additional phase prior to commencement of each downlink subframe 101A, a total number of enabled phases may be varied, during a downlink subframe 101A, based upon measurements(s) of output current of the DC-DC voltage converter circuitry 320A-2 (as discussed elsewhere herein). This enhances efficiency of the DC-DC voltage converter during the downlink subframe 101A.

In block 550E, using the determined end time of each downlink subframe of the TDD frame, at least one additional phase of the multiphase DC-DC voltage converter is disabled on or after cessation of each downlink subframe. Optionally, enable a number of phases of the multiphase DC-DC voltage converter 220A needed to deliver at least a maximum DC power required by TDD radio when the TDD radio receiving during an uplink subframe. Optionally, the at least one additional phase which is disabled is disabled upon completion of a second guard time period succeeding each downlink (DL) subframe. The first and the second guard time periods may be the same or different. Optionally, the first and the second guard time periods are a fraction of a time period of a downlink subframe. Optionally, voltage boosting may be provided as described above with respect to method 440.

Optionally, after enabling at least one additional phase prior to commencement of each uplink subframe 101B, a total number of enabled phases may be varied, during an uplink subframe 101B, based upon measurements(s) of output current of the DC-DC voltage converter circuitry

320A-2 (as discussed elsewhere herein). This enhances efficiency of the DC-DC voltage converter during the uplink subframe 101B.

The processor systems (or processor circuitry), cloud computing systems (or cloud computing circuitry), and servers (server circuitry) disclosed herein may comprise state machines, neural network, and/or other types of computing systems. Such systems may comprise processing circuitry coupled to memory circuitry. The processing circuitry may include one or more microprocessors, microcontrollers, digital signal processing (DSP) elements, application-specific integrated circuits (ASICs), and/or field programmable gate arrays (FPGAs). The processor system may include or function with software programs, firmware, or other computer readable instructions, e.g., stored in the memory circuitry, for carrying out various process tasks, calculations, and control functions, used in the methods described herein. These instructions are typically tangibly embodied on any storage media (or computer readable medium) used for storage of computer readable instructions or data structures.

The memory circuitry can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, Blu-Ray discs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

EXAMPLE EMBODIMENTS

Example 1 includes a method of more efficiently providing direct current (DC) power to a time division duplexing (TDD) radio, the method comprising: synchronizing timing of a multiphase DC-DC voltage converter with a time source external to the multiphase DC-DC voltage converter; determining a TDD frame configuration and a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, enabling at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

Example 2 includes the method of Example 1, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

Example 3 includes the method of any of Examples 1-2, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

Example 4 includes the method of any of Examples 1-3, wherein enabling the at least one additional phase comprises enabling the at least one additional phase upon a commencement of a first guard time period preceding each downlink subframe.

Example 5 includes the method of any of Examples 1-4, wherein disabling the at least one additional phase comprises disabling the at least one additional phase upon completion of a second guard time period succeeding each downlink subframe.

Example 6 includes the method of any of Examples 1-5, further comprising increasing an output voltage of the multiphase DC-DC voltage converter to compensate for a voltage drop in electrical conductors electrically coupling an output of the multiphase DC-DC voltage converter to a DC input of the TDD radio.

Example 7 includes the method of any of Examples 1-6, further comprising: measuring direct current at an output of the multiphase DC-DC voltage converter; based upon the direct current, identifying a number of phases to enable which provides increased efficiency of the multiphase DC-DC voltage converter; and adjusting a number of enabled phases of the multiphase DC-DC voltage converter to equal the identified number of phases.

Example 8 includes the method of any of Examples 1-7, wherein determining the TDD frame configuration comprises: measuring direct current drawn from an output of the multiphase DC-DC voltage converter; comparing measured direct current with stored TDD frame configurations; and based upon a comparison, identifying the TDD frame configuration.

Example 9 includes the method of any of Examples 1-8, wherein determining the TDD frame configuration comprises receiving, from a component of a radio access network (RAN) external to the multiphase DC-DC voltage converter, a TDD frame configuration.

Example 10 includes the method of any of Examples 1-9, wherein determining the reference time comprises receiving the reference time from another component of a radio access network (RAN) external to the multiphase DC-DC voltage converter.

Example 11 includes a non-transitory computer readable medium storing a program causing at least one processor to execute a process to more efficiently provide direct current (DC) power to a time division duplexing (TDD) radio, the process comprising: synchronizing timing of a multiphase DC-DC voltage converter with a time source external to the multiphase DC-DC voltage converter; determining a TDD frame configuration and a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, causing enablement of at least one additional phase of the multiphase DC-DC voltage converter; and using the determined end time of each downlink subframe in the TDD frame, on or after cessation of each downlink subframe in the TDD frame, causing disablement of the at least one additional phase of the multiphase DC-DC voltage converter.

Example 12 includes the non-transitory computer readable medium of Example 11, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

Example 13 includes the non-transitory computer readable medium of any of Examples 11-12, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

Example 14 includes the non-transitory computer readable medium of any of Examples 11-13, wherein causing enablement of the at least one additional phase comprises causing enablement of the at least one additional phase upon a commencement of a first guard time period preceding each downlink subframe.

Example 15 includes the non-transitory computer readable medium of any of Examples 11-14, wherein causing disablement of the at least one additional phase comprises causing disablement of the at least one additional phase upon completion of a second guard time period succeeding each downlink subframe.

Example 16 includes the non-transitory computer readable medium of any of Examples 11-15, wherein the process further comprises causing an increase of an output voltage of the multiphase DC-DC voltage converter to compensate for a voltage drop in electrical conductors electrically coupling an output of the multiphase DC-DC voltage converter to a DC input of the TDD radio.

Example 17 includes the non-transitory computer readable medium of any of Examples 11-16, wherein the process further comprises: receiving a direct current measured at an output of the multiphase DC-DC voltage converter; based upon the direct current, identifying a number of phases to enable which provides increased efficiency of the multiphase DC-DC voltage converter; and adjusting a number of enabled phases of the multiphase DC-DC voltage converter to equal the identified number of phases.

Example 18 includes the non-transitory computer readable medium of any of Examples 11-17, wherein determining the TDD frame configuration comprises: measuring direct current drawn from an output of the multiphase DC-DC voltage converter; comparing measured direct current with stored TDD frame configurations; and based upon the comparison, identifying the TDD frame configuration.

Example 19 includes the non-transitory computer readable medium of any of Examples 11-18, wherein determining the TDD frame configuration comprises receiving, from a component of a radio access network (RAN) external to the multiphase DC-DC voltage converter, a TDD frame configuration.

Example 20 includes the non-transitory computer readable medium of any of Examples 11-19, wherein determining the reference time comprises receiving the reference time from another component of a radio access network (RAN) external to the multiphase DC-DC voltage converter.

Example 21 includes an apparatus that more efficiently provides direct current (DC) power to a time division duplexing (TDD) radio, the apparatus comprising: multiphase DC-DC voltage converter circuitry comprising more than one phase configured to be electrically coupled, through electrical conductors, to a DC power input of the TDD radio; and processing circuitry communicatively coupled to the multiphase DC-DC voltage converter circuitry, configured to be communicatively coupled to a time source external to the apparatus, and configured to: synchronize timing of the apparatus with the time source external to the apparatus; determine a TDD frame configuration and a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using the determined start time of each downlink subframe in the TDD frame, during each downlink subframe, of the TDD frame, of the TDD radio, enable at least one additional phase of the multiphase DC-DC voltage converter circuitry; and using the determined end time of each downlink subframe in the TDD frame, on or after cessation of each downlink subframe in the TDD frame, disable the at least one additional phase of the multiphase DC-DC voltage converter circuitry.

Example 22 includes the apparatus of Example 21, wherein enabled phases of the multiphase DC-DC voltage converter circuitry during a downlink subframe comprise a number of phases of the multiphase DC-DC voltage converter circuitry that provides at least a maximum power required by the TDD radio when the TDD radio is transmitting a maximum amount of data in the downlink subframe.

Example 23 includes the apparatus of any of Examples 21-22, wherein enabled at least one phase of the multiphase DC-DC voltage converter circuitry on or after completion of a downlink subframe comprises a number of phases of the multiphase DC-DC voltage converter circuitry that provides at least a maximum DC power required by the TDD radio when the TDD radio receives during an uplink subframe.

Example 24 includes the apparatus of any of Examples 21-23, wherein enable the at least one additional phase comprises enable the at least one additional phase upon a commencement of a first guard time period preceding each downlink subframe.

Example 25 includes the apparatus of any of Examples 21-24, wherein disable the at least one additional phase comprises disable the at least one additional phase upon completion of a second guard time period succeeding each downlink subframe.

Example 26 includes the apparatus of any of Examples 21-25, wherein the processing circuitry is further configured to increase an output voltage of the multiphase DC-DC voltage converter circuitry to compensate for a voltage drop in the electrical conductors.

Example 27 includes the apparatus of any of Examples 21-26, wherein determine the TDD frame configuration comprises: measure direct current drawn from an output of the multiphase DC-DC voltage converter; compare measured direct current with stored TDD frame configurations; and based upon a comparison, identify the TDD frame configuration.

Example 28 includes the apparatus of Example 27, wherein the processing circuitry is configured to store the stored TDD frame configurations.

Example 29 includes the apparatus of any of Examples 21-28, wherein determining the TDD frame configuration comprises receiving, from a component of a radio access network (RAN) external to the multiphase DC-DC voltage converter, a TDD frame configuration.

Example 30 includes the apparatus of any of Examples 21-29, wherein determining the reference time comprises receiving the reference time from another component of a radio access network (RAN) external to the multiphase DC-DC voltage converter circuitry.

Example 31 includes the apparatus of any of Examples 21-30, wherein the processing circuitry is further configured to: receive a direct current measured at an output of the multiphase DC-DC voltage converter circuitry; based upon the direct current, identify a number of phases to enable which provides increased efficiency of the multiphase DC-DC voltage converter circuitry; and adjust a number of enabled phases of the multiphase DC-DC voltage converter circuitry to equal the identified number of phases.

Example 32 includes a method of more efficiently providing direct current (DC) power to a time division duplexing (TDD) radio, the method comprising: measuring direct current drawn from an output of a multiphase DC-DC voltage converter; using the direct current, identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, enabling at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

Example 33 includes the method of Example 32, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

Example 34 includes the method of any of Examples 32-33, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

Example 35 includes the method of any of Examples 32-34, wherein enabling the at least one additional phase comprises enabling the at least one additional phase upon a commencement of a first guard time period preceding each downlink subframe.

Example 36 includes the method of any of Examples 32-35, wherein disabling the at least one additional phase comprises disabling the at least one additional phase upon completion of a second guard time period succeeding each downlink subframe.

Example 37 includes the method of any of Examples 32-36, further comprising increasing an output voltage of the multiphase DC-DC voltage converter to compensate for a voltage drop in electrical conductors electrically coupling an output of the multiphase DC-DC voltage converter to a DC input of the TDD radio.

Example 38 includes the method of any of Examples 32-37 further comprising: measuring a direct current at an output of the multiphase DC-DC voltage converter; based upon the direct current, identifying a number of phases to enable which provides increased efficiency of the multiphase DC-DC voltage converter; and adjusting a number of enabled phases of the multiphase DC-DC voltage converter to equal the identified number of phases.

Example 39 includes a non-transitory computer readable medium storing a program causing at least one processor to execute a process to more efficiently provide direct current (DC) power to a time division duplexing (TDD) radio, the process comprising: receiving measurements of direct current drawn from an output of a multiphase DC-DC voltage converter; using the measurements, identifying a TDD frame configuration of the TDD radio and determining a reference time; wherein the reference time is a time when a reference TDD frame commences in a past, a present, or a future, or another time from which such time can be derived; using at least one of the TDD frame configuration and the reference time, determining a start time and an end time of each downlink subframe in a TDD frame; using the determined start time of each downlink subframe in the TDD frame, during each downlink subframe, of the TDD frame, of the TDD radio, causing enablement of at least one additional phase of the multiphase DC-DC voltage converter; and using the determined end time of each downlink subframe in the TDD frame, on or after cessation of each downlink subframe in the TDD frame, disabling the at least one additional phase of the multiphase DC-DC voltage converter.

Example 40 includes the non-transitory computer readable medium of Example 39, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

Example 41 includes the non-transitory computer readable medium of any of Examples 39-40, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

Example 42 includes the non-transitory computer readable medium of any of Examples 39-41, wherein causing enablement of the at least one additional phase comprises causing enablement of the at least one additional phase upon a commencement of a first guard time period preceding each downlink subframe.

Example 43 includes the non-transitory computer readable medium of any of Examples 39-42, wherein causing disablement of the at least one additional phase comprises causing disablement of the at least one additional phase upon completion of a second guard time period succeeding each downlink subframe.

Example 44 includes the non-transitory computer readable medium of any of Examples 39-43, wherein the process further comprises causing an increase of an output voltage of the multiphase DC-DC voltage converter to compensate for a voltage drop in electrical conductors electrically coupling an output of the multiphase DC-DC voltage converter to a DC input of the TDD radio.

Example 45 includes an apparatus that more efficiently provides direct current (DC) power to a time division duplexing (TDD) radio, the apparatus comprising: multiphase DC-DC voltage converter circuitry comprising more than one phase configured to be electrically coupled, through electrical conductors, to a DC power input of the TDD radio; and processing circuitry communicatively coupled to the multiphase DC-DC voltage converter circuitry and configured to: receive measurements of direct current drawn at an output of the apparatus; using the measurements, identify a TDD frame configuration of the TDD radio and determining a reference time; wherein the reference time is a time when a reference TDD frame commences in a past, a present, or a future, or another time from which such time can be derived; using at least one of the TDD frame configuration and the reference time, determine a start time and an end time of each downlink subframe in a TDD frame; using at least one of the TDD frame configuration and the reference time, determine a start time and an end time of each downlink subframe in a TDD frame; using the determined start time of each downlink subframe in the TDD frame, during each downlink subframe, of the TDD frame, of the TDD radio, enable at least one additional phase of the multiphase DC-DC voltage converter circuitry; and using the determined end time of each downlink subframe in the TDD frame, on or after cessation of each downlink subframe in the TDD frame, disable the at least one additional phase of the multiphase DC-DC voltage converter circuitry.

Example 46 includes the apparatus of Example 45, wherein enabled phases of the multiphase DC-DC voltage converter circuitry during a downlink subframe comprise a number of phases of the multiphase DC-DC voltage converter circuitry that provides at least a maximum power required by the TDD radio when the TDD radio is transmitting a maximum amount of data in the downlink subframe.

Example 47 includes the apparatus of any of Examples 45-46, wherein enabled at least one phase of the multiphase DC-DC voltage converter circuitry on or after completion of a downlink subframe comprises a number of phases of the multiphase DC-DC voltage converter circuitry that provides at least a maximum DC power required by the TDD radio when the TDD radio receives during an uplink subframe.

Example 48 includes the apparatus of any of Examples 45-47, wherein enable the at least one additional phase comprises enabling the at least one additional phase upon a commencement of a first guard time period preceding each downlink subframe.

Example 49 includes the apparatus of any of Examples 45-48, wherein disable the at least one additional phase comprises disable the at least one additional phase upon completion of a second guard time period succeeding each downlink subframe.

Example 50 includes the apparatus of any of Examples 45-49, wherein the processing circuitry is further configured to increase an output voltage of the multiphase DC-DC voltage converter circuitry to compensate for a voltage drop in the electrical conductors.

Example 51 includes the apparatus of any of Examples 45-50, wherein the processing circuitry is further configured to: receive a direct current measured at the output of the apparatus; based upon the direct current, identify a number of phases to enable which provides increased efficiency of the multiphase DC-DC voltage converter circuitry; and adjust a number of enabled phases of the multiphase DC-DC voltage converter circuitry to equal the identified number of phases.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of more efficiently providing direct current (DC) power to a time division duplexing (TDD) radio, the method comprising:
   synchronizing timing of a multiphase DC-DC voltage converter with a time source external to the multiphase DC-DC voltage converter;
   determining a TDD frame configuration and a reference time;
   wherein the reference time is a time when a reference TDD frame commences in a past, a present, or a future, or another time from which such time can be derived;
   using at least one of the TDD frame configuration and the reference time, determining a start time and an end time of each downlink subframe in a TDD frame;
   using the determined start time of each downlink subframe in the TDD frame, during each downlink subframe, of the TDD frame, of the TDD radio, enabling at least one additional phase of the multiphase DC-DC voltage converter; and
   using the determined end time of each downlink subframe in the TDD frame, on or after cessation of each downlink subframe in the TDD frame, disabling the at least one additional phase of the multiphase DC-DC voltage converter.

2. The method of claim 1, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

3. The method of claim 1, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

4. The method of claim 1, wherein enabling the at least one additional phase comprises enabling the at least one additional phase upon a commencement of a first guard time period preceding each downlink subframe.

5. The method of claim 1, wherein disabling the at least one additional phase comprises disabling the at least one additional phase upon completion of a second guard time period succeeding each downlink subframe.

6. The method of claim 1, further comprising increasing an output voltage of the multiphase DC-DC voltage converter to compensate for a voltage drop in electrical conductors electrically coupling an output of the multiphase DC-DC voltage converter to a DC input of the TDD radio.

7. The method of claim 1, further comprising:

measuring direct current at an output of the multiphase DC-DC voltage converter;

based upon the direct current, identifying a number of phases to enable which provides increased efficiency of the multiphase DC-DC voltage converter; and adjusting a number of enabled phases of the multiphase DC-DC voltage converter to equal the identified number of phases.

8. The method of claim 1, wherein determining the TDD frame configuration comprises:

measuring direct current drawn from an output of the multiphase DC-DC voltage converter;

comparing measured direct current with stored TDD frame configurations; and based upon a comparison, identifying the TDD frame configuration.

9. The method of claim 1, wherein determining the TDD frame configuration comprises receiving, from a component of a radio access network (RAN) external to the multiphase DC-DC voltage converter, a TDD frame configuration.

10. The method of claim 1, wherein determining the reference time comprises receiving the reference time from another component of a radio access network (RAN) external to the multiphase DC-DC voltage converter.

11. A non-transitory computer readable medium storing a program causing at least one processor to execute a process to more efficiently provide direct current (DC) power to a time division duplexing (TDD) radio, the process comprising:

synchronizing timing of a multiphase DC-DC voltage converter with a time source external to the multiphase DC-DC voltage converter;

determining a TDD frame configuration and a reference time;

wherein the reference time is a time when a reference TDD frame commences in a past, a present, or a future, or another time from which such time can be derived;

using at least one of the TDD frame configuration and the reference time, determining a start time and an end time of each downlink subframe in a TDD frame;

using the determined start time of each downlink subframe in the TDD frame, during each downlink subframe, of the TDD frame, of the TDD radio, causing enablement of at least one additional phase of the multiphase DC-DC voltage converter; and using the determined end time of each downlink subframe in the TDD frame, on or after cessation of each downlink subframe in the TDD frame, causing disablement of the at least one additional phase of the multiphase DC-DC voltage converter.

12. The non-transitory computer readable medium of claim 11, wherein enabled phases of the multiphase DC-DC voltage converter during a downlink subframe comprise a number of phases of the multiphase DC-DC voltage converter that provides at least a maximum power required by the TDD radio when the TDD radio is transmitting a maximum amount of data in the downlink subframe.

13. The non-transitory computer readable medium of claim 11, wherein enabled at least one phase of the multiphase DC-DC voltage converter on or after completion of a downlink subframe comprises a number of phases of the multiphase DC-DC voltage converter that provides at least a maximum DC power required by the TDD radio when the TDD radio receives during an uplink subframe.

14. The non-transitory computer readable medium of claim 11, wherein causing enablement of the at least one additional phase comprises causing enablement of the at least one additional phase upon a commencement of a first guard time period preceding each downlink subframe.

15. The non-transitory computer readable medium of claim 11, wherein causing disablement of the at least one additional phase comprises causing disablement of the at least one additional phase upon completion of a second guard time period succeeding each downlink subframe.

16. The non-transitory computer readable medium of claim 11, wherein the process further comprises causing an increase of an output voltage of the multiphase DC-DC voltage converter to compensate for a voltage drop in electrical conductors electrically coupling an output of the multiphase DC-DC voltage converter to a DC input of the TDD radio.

17. The non-transitory computer readable medium of claim 11, wherein the process further comprises:

receiving a direct current measured at an output of the multiphase DC-DC voltage converter;

based upon the direct current, identifying a number of phases to enable which provides increased efficiency of the multiphase DC-DC voltage converter; and adjusting a number of enabled phases of the multiphase DC-DC voltage converter to equal the identified number of phases.

18. The non-transitory computer readable medium of claim 11, wherein determining the TDD frame configuration comprises:

measuring direct current drawn from an output of the multiphase DC-DC voltage converter;

comparing measured direct current with stored TDD frame configurations; and based upon the comparison, identifying the TDD frame configuration.

19. The non-transitory computer readable medium of claim 11, wherein determining the TDD frame configuration comprises receiving, from a component of a radio access network (RAN) external to the multiphase DC-DC voltage converter, a TDD frame configuration.

20. The non-transitory computer readable medium of claim 11, wherein determining the reference time comprises receiving the reference time from another component of a radio access network (RAN) external to the multiphase DC-DC voltage converter.

21. An apparatus that more efficiently provides direct current (DC) power to a time division duplexing (TDD) radio, the apparatus comprising:

multiphase DC-DC voltage converter circuitry comprising more than one phase configured to be electrically coupled, through electrical conductors, to a DC power input of the TDD radio; and processing circuitry communicatively coupled to the multiphase DC-DC voltage converter circuitry, configured to be communicatively coupled to a time source external to the apparatus, and configured to:

synchronize timing of the apparatus with the time source external to the apparatus;

determine a TDD frame configuration and a reference time;

wherein the reference time is a time when a reference TDD frame commences in a past, a present, or a future, or another time from which such time can be derived;

using at least one of the TDD frame configuration and the reference time, determine a start time and an end time of each downlink subframe in a TDD frame;

using the determined start time of each downlink subframe in the TDD frame, during each downlink subframe, of the TDD frame, of the TDD radio, enable at least one additional phase of the multiphase DC-DC voltage converter circuitry; and using the determined end time of each downlink subframe in the TDD frame, on or after cessation of each downlink subframe in the TDD frame, disable the at least one additional phase of the multiphase DC-DC voltage converter circuitry.

22. The apparatus of claim 21, wherein enabled phases of the multiphase DC-DC voltage converter circuitry during a downlink subframe comprise a number of phases of the multiphase DC-DC voltage converter circuitry that provides at least a maximum power required by the TDD radio when the TDD radio is transmitting a maximum amount of data in the downlink subframe.

23. The apparatus of claim 21, wherein enabled at least one phase of the multiphase DC-DC voltage converter circuitry on or after completion of a downlink subframe comprises a number of phases of the multiphase DC-DC voltage converter circuitry that provides at least a maximum DC power required by the TDD radio when the TDD radio receives during an uplink subframe.

24. The apparatus of claim 21, wherein enable the at least one additional phase comprises enable the at least one additional phase upon a commencement of a first guard time period preceding each downlink subframe.

25. The apparatus of claim 21, wherein disable the at least one additional phase comprises disable the at least one additional phase upon completion of a second guard time period succeeding each downlink subframe.

26. The apparatus of claim 21, wherein the processing circuitry is further configured to increase an output voltage of the multiphase DC-DC voltage converter circuitry to compensate for a voltage drop in the electrical conductors.

27. The apparatus of claim 21, wherein determine the TDD frame configuration comprises:

measure direct current drawn from an output of the multiphase DC-DC voltage converter;

compare measured direct current with stored TDD frame configurations; and based upon a comparison, identify the TDD frame configuration.

28. The apparatus of claim 27, wherein the processing circuitry is configured to store the stored TDD frame configurations.

29. The apparatus of claim 21, wherein determining the TDD frame configuration comprises receiving, from a component of a radio access network (RAN) external to the multiphase DC-DC voltage converter, a TDD frame configuration.

30. The apparatus of claim 21, wherein determining the reference time comprises receiving the reference time from another component of a radio access network (RAN) external to the multiphase DC-DC voltage converter circuitry.

31. The apparatus of claim 21, wherein the processing circuitry is further configured to:

receive a direct current measured at an output of the multiphase DC-DC voltage converter circuitry;

based upon the direct current, identify a number of phases to enable which provides increased efficiency of the multiphase DC-DC voltage converter circuitry; and adjust a number of enabled phases of the multiphase DC-DC voltage converter circuitry to equal the identified number of phases.

* * * * *